A. M. VAN NESS.
Automatic Wagon-Brake.

No. 217,435.  Patented July 8, 1879.

WITNESSES:
Achilles Sehehl.
C. Sedgwick

INVENTOR:
A. M. Van Ness
BY Munn & Co
ATTORNEYS.

UNITED STATES PATENT OFFICE.

ADDISON M. VAN NESS, OF SEYMOUR, IOWA.

IMPROVEMENT IN AUTOMATIC WAGON-BRAKES.

Specification forming part of Letters Patent No. 217,435, dated July 8, 1879; application filed April 7, 1879.

*To all whom it may concern:*

Be it known that I, ADDISON MASON VAN NESS, of Seymour, in the county of Wayne and State of Iowa, have invented a new and useful Improvement in Automatic Wagon-Brakes, of which the following is a specification.

Figure 1:
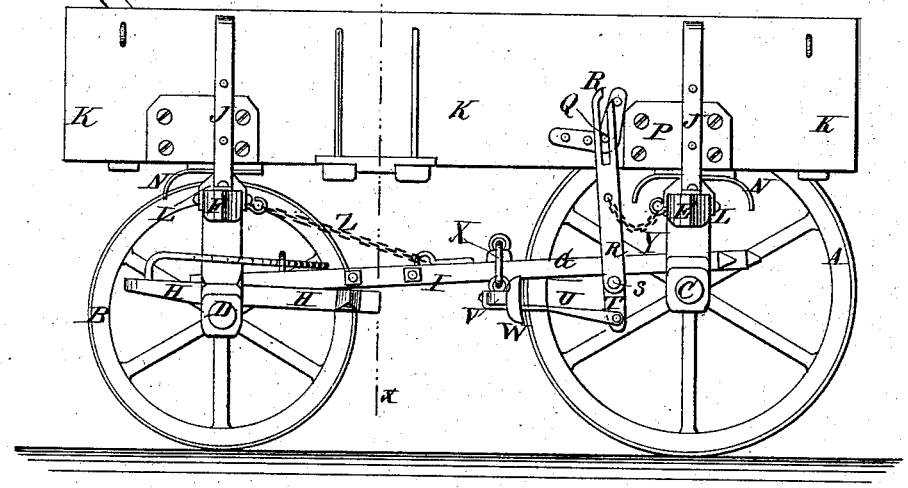
Figure 2:
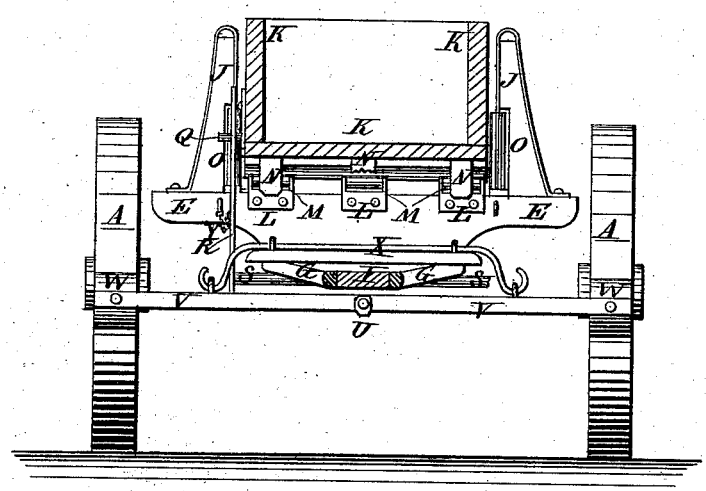

Figure 1 is a side view of a wagon to which my improved brake has been applied. Fig. 2 is a cross-section of the same, taken through the line $x\ x$, Fig. 1.

Similar letters of reference indicate corresponding parts.

The object of this invention is to furnish an improved wagon-brake which shall be so constructed that it will be applied by the forward pressure of the load in going down hill, and will be gradually taken off by the draft as the wagon comes to a level, and which shall be simple in construction, and strong, durable, and reliable in use.

A represents the rear wheels, B the forward wheels, C the rear axle, D the forward axle, E the rear bolster, F the forward bolster, G the rear hounds, H the forward hounds, I the reach, J the stakes, and K the body, of a wagon.

To the upper sides of the bolsters E F are attached bearings L, in which are pivoted rollers M, upon which rest plates or straps N. The outer ends, or both ends, of the straps or plates N are curved downward, to limit the movement of the said plates. The plates or straps N are firmly attached to the bottom of the wagon-body K.

To bearings attached to the inner sides of the stakes J are pivoted rollers O, against which rest plates P, attached to the sides of the wagon-body K.

To the sides of the wagon-body K, a little in front of the rear stakes, J, are attached two pins, Q, which enter longitudinal slots in the upper ends of the levers R. The lower ends of the levers R are rigidly attached to the ends of a shaft, S, which works in bearings attached to the rear part of the rear hounds, G.

To the middle part of the shaft S is rigidly attached the end of a lever, T, to the lower end of which is pivoted the rear end of a rod, U. The forward end of the rod U is attached to the center of the brake-bar V, to the rear side of which are attached the brake-shoes W. The brake-bar V is hung from the downwardly-curved ends of the rod X, the middle part of which works in bearings attached to the rear hounds, G. With this construction, when the wagon begins to descend a hill the body K moves forward, which forward movement operates the levers and applies the brakes. When the wagon gradually comes to a level the body K gradually moves back and withdraws the brakes.

To the levers R are attached the forward ends of two chains, Y, the rear ends of which are hooked upon hooks attached to the bolster E, so that by taking up and letting out the said chains Y the force with which the brake will be applied can be regulated at will.

The forward bolster, F, is strengthened against forward pressure by the brace-chains Z, the forward ends of which are attached to the end parts of the said bolster, and their rear ends are attached to the reach I, as shown in Fig. 1.

I have described the brake as being applied to a wagon-body; but it is equally applicable to a hay-rack, a wood-rack, a stone-bed, or any other body or bed, according as the purpose for which the wagon is to be used may require.

Having thus described my invention, I claim as new and desire to secure by Letters Patent—

1. The combination of the pins Q, the levers R, the shaft S, the lever T, the connecting-rod U, and the bent suspension-rod X with the brake-bar V, the rear hounds, G, and the body K, substantially as herein shown and described.

2. The combination of the gage-chains Y with the brake-levers R and the rear bolster, E, substantially as herein shown and described.

ADDISON MASON VAN NESS.

Witnesses:
CHARLEY THATCHER,
JOHN FREESE.